United States Patent
Shimomura

[11] 3,729,999
[45] May 1, 1973

[54] BAROMETRIC ALTIMETER
[76] Inventor: Naonobu Shimomura, No. 13-8 Sakuragaoka-cho, Shibuya-ku, Tokyo, Japan
[22] Filed: May 12, 1972
[21] Appl. No.: 254,784

[30] Foreign Application Priority Data

May 12, 1971 Japan ................................46/31858

[52] U.S. Cl. .................................................... 73/384
[51] Int. Cl. ................................................ G01l 7/00
[58] Field of Search ........................ 73/384, 386, 387, 73/393; 235/183, 150.2, 150.22

[56] References Cited

UNITED STATES PATENTS 3,693,405    9/1972    Shimomura ............................. 73/384

*Primary Examiner*—Donald O. Woodiel
*Attorney*—Harry John Staas et al.

[57] ABSTRACT

Apparatus is disclosed for comparing the magnitude of an exponentially changing signal with time respectively with that of a signal proportional to the atmospheric pressure at a reference altitude and that of a signal proportional to the atmospheric pressure at the altitude to be measured; further, their respective times of coincidence are measured. The altitude can then be measured because this time difference is proportional to the difference between the altitude to be measured and the reference altitude and, furthermore, the accurate altitude can be measured executing a correction of the temperature distribution.

18 Claims, 10 Drawing Figures

Patented May 1, 1973 3,729,999

BAROMETRIC ALTIMETER

BACKGROUND OF THE INVENTION

1. Field of the Invention

This invention relates to barometric altimeters, and particularly to those accurate barometric altimeters to be used for aircraft.

2. Description of the Prior Art

The principle of a barometric altimeter is based on a fact that the atmospheric pressure decreases as the altitude increases, and the altitude can be obtained by the measurement of the atmospheric pressure. In the conventional barometric altimeter, the atmospheric pressure is measured from the deformation of an aneroid capsule due to the change of the atmospheric pressure and this deformation is indicated after being mechanically magnified by a train of gears. Thus, as the deformation is mechanically magnified, even a slight friction in a movable member results a large error. This error is not proportional to the altitude and is not decreased at low altitude, and hence an aircraft may get into danger in a low altitude flight. In order that the meter be graduated in a linear scale, a logarithmic transformation mechanism with the mechanical magnification of deformation of the capsule is necessary and the mechanical accuracy of such transformation mechanism is very critical. In those applications where the altimeter is incorporated in an automatic altitude reporting system, a complex high-cost encoder of the contactless type such as an optical encoder has been used.

To overcome these problems, Applicant has proposed barometric altimeter which senses the altitude by measuring the time interval between the times when an exponentially changing voltage with time, coincides respectively with a voltage proportional to the atmospheric pressure at a reference altitude and a voltage proportional to the atmospheric pressure at the altitude to be measured. The relation between the atmospheric pressure $P_0$ at the reference altitude $H_0$ and the atmospheric pressure $P_1$ at the altitude $H_1$ to be measured, is given as follows, $$H_1 - H_0 = k(\log P_0 - \log P_1) \quad (1)$$

where, $k$ is a constant determined by the mean temperature. An exponential voltage $V_2$ is represented as follows, $$V_2 = V e^{-ct} \quad (2)$$

where, $V$ is an initial voltage and $c$ is an inverse of a time-constant. If the times, when voltages $V_0$ and $V_1$ coincide with the exponential voltage $V_2$, are denoted respectively as $t_0$ and $t_1$, the voltage $V_0$ proportional to the atmospheric pressure $P_0$ and the voltage $V_1$ proportional to the atmospheric pressure $P_1$ are represented as follows, $$V e^{-ct} = V_0 \quad (3)$$

$$V e^{-ct} = V_1 \quad (4)$$

Therefore, $$\log V_0 - \log V_1 = c(t_1 - t_0) \quad (5)$$

The voltages $V_0$ and $V_1$ are proportional respectively to the atmospheric pressure $P_0$ and $P_1$, and hence, $$H_1 - H_0 = kc(t_1 - t_0) \quad (6)$$

The altitude $H_1$ to be measured can be obtained from the equation (6) if the times $t_0$ and $t_1$, when the exponential voltage $V_2$ coincides respectively with voltages $V_0$ and $V_1$, are measured.

BRIEF SUMMARY OF THE INVENTION

An object of this invention is to measure the accurate altitude executing a correction for the temperature in such barometric altimeter as described above.

Another object of this invention is to make an altimeter execute automatically the temperature correction with relation to the altitude.

A further object of this invention is to make the altimeter execute a digital measurement of the altitude.

Briefly stated, the barometric altimeter of this invention is composed of means for generating an electric signal which changes exponentially with time; means for generating electric signals proportional respectively to the atmospheric pressure of the altitude to be measured and that of a reference altitude; means for counting which is controlled by the times when the electric signals coincide with each other; and means for correcting the counted value obtained by the counting means for temperature variations.

BRIEF DESCRIPTION OF THE DRAWINGS

These and other objects and advantages of the present invention will become more apparent by referring to the following detailed description and accompanying drawings, in which:

FIG. 10 is an embodiment showing a modification of a part of the circuit of FIG. 8.

DETAILED DESCRIPTION OF THE PREFERRED EMBODIMENTS

Figure 1:
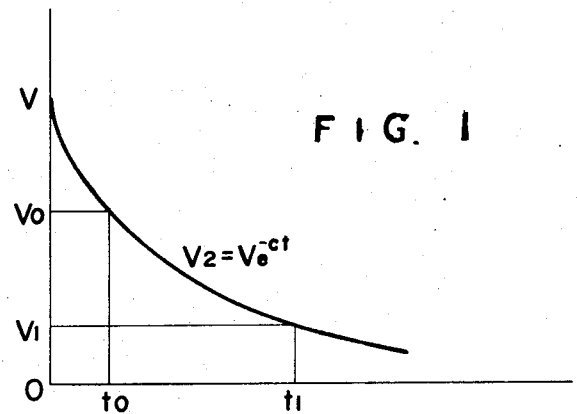
FIG. 1 is an explanatory graph of the principles of this invention.

A detailed description of this invention is made referring to FIG. 1. Although voltage, current, etc. may be used as an electric signal representing the atmospheric pressure, the description is made hereunder in terms of voltages. $V_0$ is that voltage proportional to the atmospheric pressure $P_0$ at a reference altitude; $V_1$ is a voltage proportional to the atmospheric pressure $P_1$ at the altitude to be measured; and $V_2$ is an exponentially changing voltage indicated in the equation (2), given above. The altitude to be measured is obtained from the equation (6), by measuring the times $t_0$ and $t_1$ when the value of this voltage $V_2$ coincides respectively with those of voltages $V_0$ and $V_1$.

Figure 2:
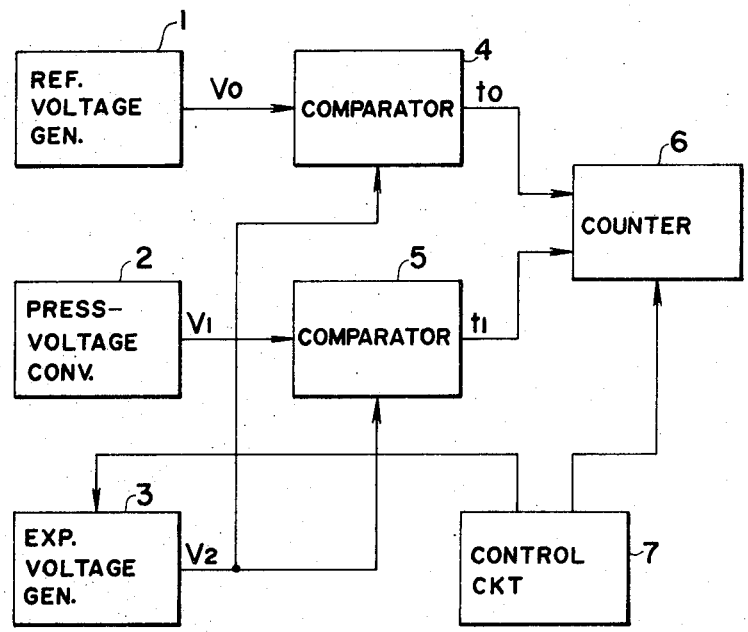
FIG. 2 is a block diagram of the barometric altimeter of this invention.

FIG. 2 shows a barometric altitude measuring circuit composed of a reference voltage generator 1 for generating a first electrical signal or voltage $V_0$ as an electrical signal proportional to the atmospheric pressure $P_0$ at a reference altitude $H_0$; a pressure-voltage converter 2 for generating a second electrical signal or voltage $V_1$ as an electric signal proportional to the atmospheric pressure $P_1$ at the altitude $H_1$ to be measured; and exponentially changing voltage generator 3 for generating a third electric signal or voltage $V_2$ as an electrical signal changing exponentially with time; a comparator 4 which generates a pulse at the time $t_0$ when the voltage $V_2$ coincides with the voltage $V_0$; a comparator 5 which generates a pulse at the time $t_1$ when the voltage $V_2$ coincides with the voltage $V_1$; a counter 6 which counts a frequency of an oscillator during the interval between coincided pulses generated at the times $t_0$ and $t_1$ from the comparators 4 and 5; and a control circuit 7 which controls the above-mentioned oscillator, the exponential voltage generator 3, and the correction for the temperature.

According to the Laplace's formula, the relation between the altitude $H_{1(m)}$ to be measured and a reference altitude $H_{0(m)}$ is shown by the following equation, $$H_1 - H_0 = 18400(\log_{10}P_0 - \log_{10}P_1)(1+0.00367\theta) \quad (7)$$

where, $\theta$ is the mean temperature (°C) of the atmosphere between altitudes $H_0$ and $H_1$. The unit measurement of altitude is the meter in the equation (7), but the foot unit measurement may be used by changing the equation's coefficient. Any units of the atmospheric pressure $P_0$ and $P_1$ may be used.

Now, when $c = 1$ in equation (2), that is, the time-constant is 1 second and common logarithms are used, the equation (1) is presented as follows, $$H_1 - H_0 = 2.3026 \, k(\log_{10}P_0 - \log_{10}P_1) \quad (8)$$

Then, from the equations (7) and (8), the next equation is obtained, $$k = 7991.03(1 + 0.00367\theta) \quad (9)$$

Therefore, counter 6 indicates directly the altitude expressed in meters if the counting frequency of the counter 6 is set at the value of equation (9). To obtain the accurate altitude from a runway in case of landing of an aircraft, the voltage $V_0$ proportional to the atmospheric pressure at the landing point is set on the basis of the weather information from the landing airfield, and the coefficient k obtained from the equation (9) by the temperature of the landing point, is given as a counting frequency of the counter 6. Even though there are some errors due to the temperature difference between the mean temperature and the temperature at the landing point when the altitude is high, these errors decrease according to the approach to landing point of the aircraft and, as an extremely accurate altitude measurement can be obtained at the time of landing, landing failures can be prevented. The counting frequency of the counter 6 can be adjusted manually by a dial of a variable frequency oscillator according to the temperature. It is preferable to use a frequency synthesizer to perform this function most accurately.

Figure 3:
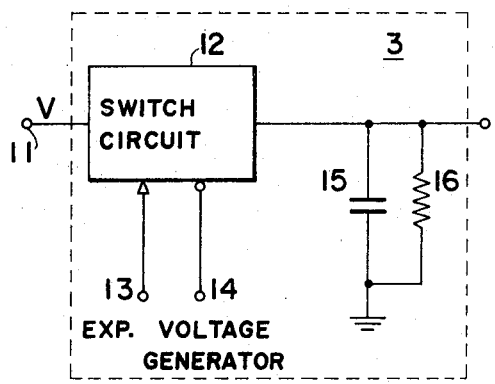
FIG. 3 is a block diagram of an embodiment of the circuit which generates exponentially changing voltages in FIG. 2.

As shown in FIG. 3, an exponential voltage generator 3 may be illustratively comprised of an integrator circuit, a differentiator circuit, or a semiconductor switch 12, a capacitor 15, and a resistor 16. In FIG. 3, an initial voltage $V$ is applied to a terminal 11 and the capacitor 15 is charged with this voltage $V$ by closing the switch 12 by a pulse applied to a terminal 13. As a result, an exponential voltage $V_2$ of equation (2) is obtained by rendering the switch 12 non-conductive in response to a pulse applied to a terminal 14. The pulses applied to the terminals 13 and 14 are obtained from the control circuit 7 shown in FIG. 2. The exponential function generated by the circuit of FIG. 3 decays with time, but an exponential function which increases with time can also be employed for the purpose of this invention. Such increasing exponential waveform is generated, for example, by an integrator with positive feedback circuit. If we use alternatively such an exponential function instead of a decaying type, the timing of the coincident pulses which are generated at the times of crossing over the exponential waveform and the two signals representing the reference altitude and the altitude to be measured are reversed.

In both cases, decaying or increasing, the exponential function does not necessarily cross over the two signals representing the reference altitude and the altitude to be measured, i.e. an exponential function which starts, as an initial value, from any one of the two signals representing the altitudes can be used. In such a case, a pulse which is generated at the instant of the start is used and may be regarded hereunder as a pulse generated at the time of coincidence of the exponential function and the signal representing the altitude from which the exponential function starts. This enables to eliminate one of the comparators 4 or 5 of FIG. 2 which would operate first in case of crossing over arrangement by utilizing starting pulse for exponential voltage generator 13 in place of the first coincident pulse to control the counter 6. Although the description hereafter is based on a decaying exponential function, this invention is not limited to such a decaying-type exponential function.

When the reference altitude $H_0$ is sea-level and the atmospheric pressure at sea-level is $P_s$, the following equation is obtained from the equation (7), $$H_1 = 18400(\log_{10}P_s - \log_{10}P_1)(1+0.00367\theta) \quad (10)$$

Where altitude is denoted by $H_b$ for the mean temperature $\theta=0$; then, $$H_b = 18400(\log_{10}P_s - \log_{10}P_1) \quad (11)$$

Therefore, the equation (10) is represented by, $$H_1 = (1 + 0.00367\theta)H_b \quad (12)$$

Figure 4:
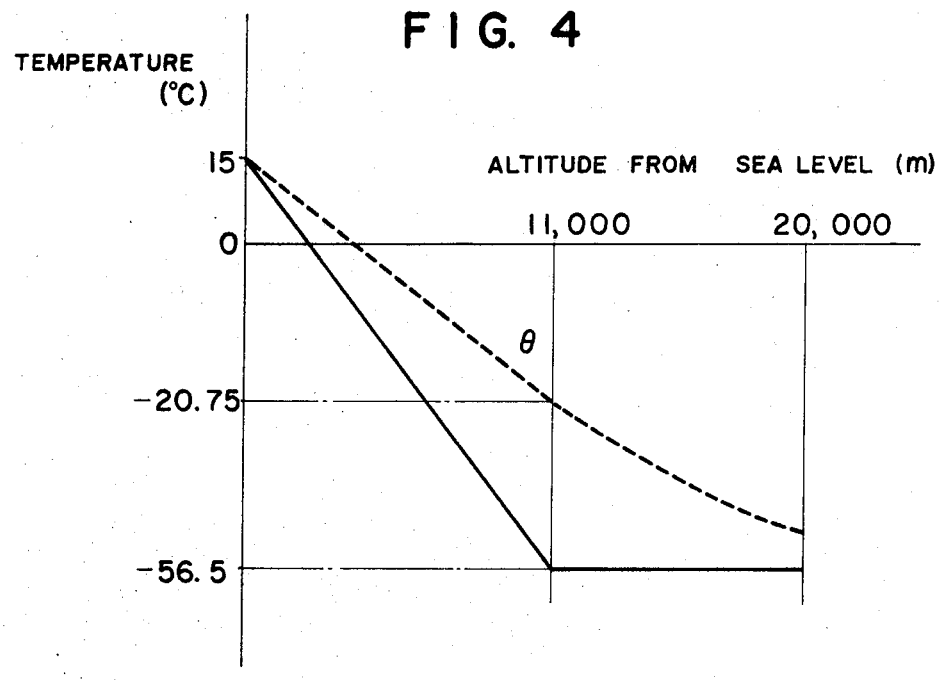
FIG. 4 is a graph showing the ICAO standard atmospheric temperature distribution.

Now, a temperature correction of this invention for the barometric altimeter according to the standard atmosphere adopted by ICAO in 1952 is explained. In the ICAO standard atmosphere, the temperature at sea-level is 15°C, and it decreases 6.5°C for every 1,000m increment of height, and becomes −56.5°C at the altitude of 11,000m; this temperature is unchanged until the altitude reaches 20,000m as indicated in FIG. 4. Therefore, if the altitude $H_1$ is in the range $H_1 \leq$ 11,000m, the mean temperature $\theta$ is, $$\theta = 15 - 0.00325 H_1 \quad (13)$$

This is indicated with a dotted line in FIG. 4.

Figure 5:
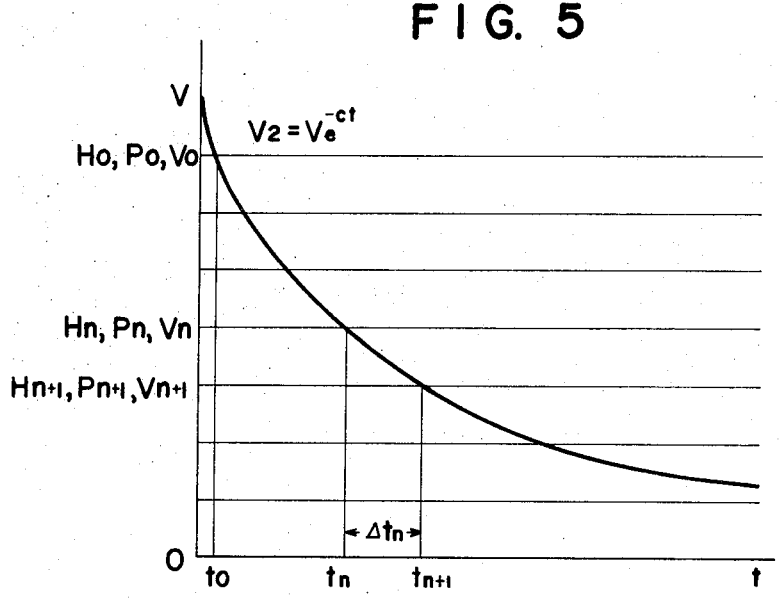
FIG. 5 is an explanatory graph of the temperature correction by the barometric altimeter of this invention.

Suppose the atmosphere is composed of many thin layers, and the altitude, the atmospheric pressure, the voltage proportional to this atmospheric pressure, and the mean temperature at the $n$th layer from the lower side thereof, are denoted respectively by $H_n$, $P_n$, $V_n$, and $\theta_n$, and the time when an exponential voltage $V_2$ coincides with the voltage $V_n$ is denoted by $t_n$ as indicated in FIG. 5. Then, the equation (7) holds also for this thin layer.
Therefore, $$\Delta t_n = t_{n+1} - t_n \quad (14)$$

$$\Delta H_n = H_{n+1} - H_n = 18400(\log_{10}P_n - \log_{10}P_{n+1})(1+0.00367\theta_n) \quad (15)$$

The value of $k$ in the equation (9) is denoted by $k_n$ for the $n$th layer. Then, $$\Delta H_n = k_n \Delta t_n \quad (16)$$

$$H_n = \sum_{i=1}^{n} \Delta H_i = \sum_{i=1}^{n} k_i \Delta t_i \quad (17)$$

The mean temperature of a thin atmospheric layer can be considered to be the temperature of this layer; therefore, the temperature of the $n$th layer is given as follows:

$$\theta_n = 15 - \frac{6.5}{1000} H_n = 15 - 0.0065 \sum_{i=1}^{n} k_i \Delta t_i \quad (18)$$

Therefore, $$k_n = 7991(1 + 0.00367\theta_n)$$

$$= 7991\left[1 + 0.00367(15 - 0.0065 \sum_{i=1}^{n} k_i \Delta t_i)\right]$$

$$= 8431\left[1 - 2.2611 \times 10^{-5} \sum_{i=1}^{n} k_i \Delta t_i\right] \quad (19)$$

$$\sum_{n}^{i=1} k_i \Delta t_i$$

of the equation (19) indicates the altitude of the $n$th layer. Therefore, if the counting frequency of the counter 6 shown in FIG. 2 is set to 8431 at the time $t = t_0$, and after that the counter 6 counts the changing frequency $k_n$ according to the altitude as indicated in the equation (19), the altitude corrected according to the temperature distribution of the ICAO standard atmosphere, is obtained by the counter 6.

Figure 6:
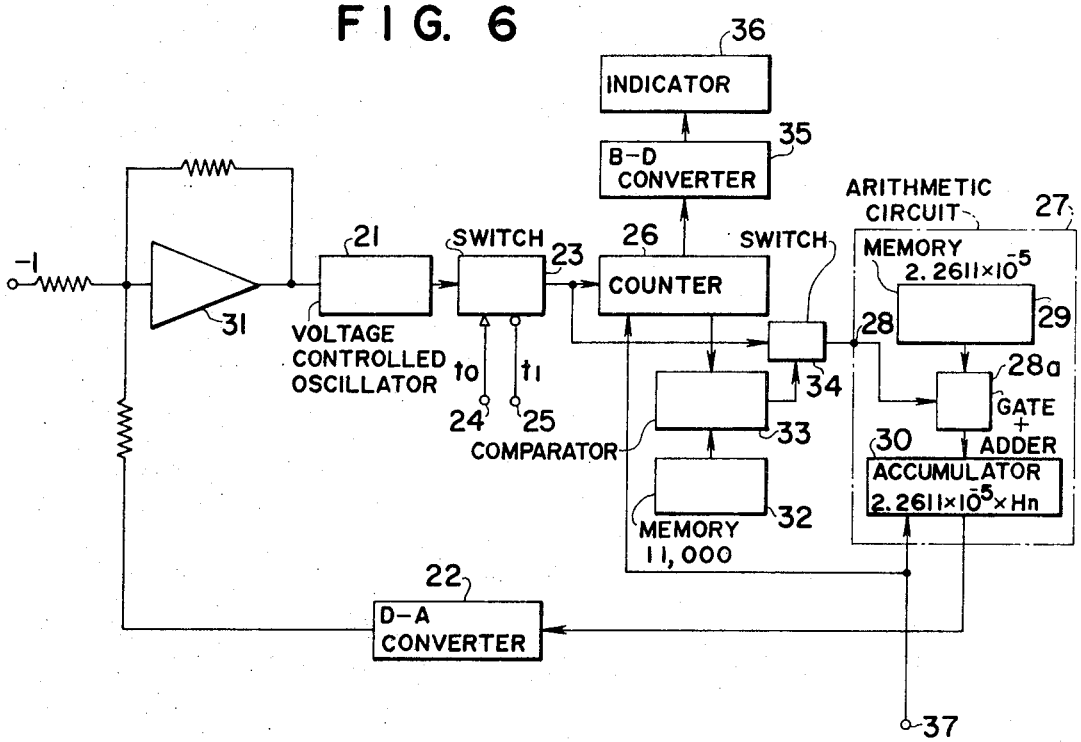
FIG. 6 is a block diagram of an embodiment of the temperature correction circuit in the barometric altimeter of this invention.

FIG. 6 is a block diagram of a temperature correction circuit which controls the counting frequency of the counter 6 according to the equation (19). In FIG. 6, a voltage-controlled oscillator 21 changes the oscillation frequency in proportion to the output of a summing amplifier 31 whose input is connected to signal −1 and also to the output of a digital-analog converter 22. The controlling input voltage of this voltage-controlled oscillator 21 is 1 at $t<t_0$. At this time, the oscillation frequency is 8431 Hz. At $t=t_0$, that is, when an exponential voltage $V_2$ is compared and coincided with the reference voltage $V_0$ in the comparator 4 of FIG. 2, a pulse is applied to a terminal 24 and then a switch 23 is turned ON. Therefore, the output of the voltage-controlled oscillator 21 is applied to a counter 26 and the counter 26 begins to count. An arithmetic circuit 27 is composed of a fixed memory 29 and an accumulator 30. A number $2.2611 \times 10^{-5}$ is memorized in the fixed memory 29 and is added in the accumulator 30 through a gate and adder circuit 28a controlled by an operation command given to a terminal 28 for every one count of the counter 26. The output of the accumulator 30 is converted to an analog value by a digital-analog converter 22 and is applied as one input of the summing amplifier 31. An input of −1 is applied to another input of amplifier 31 and $1 - 2.2611 \times 10^{-5}$ is obtained at its output when the first pulse is applied. Therefore, when the output of the summing amplifier 31 becomes less than 1, the oscillation frequency of the voltage-controlled oscillator 21 becomes slightly lower than 8431 Hz. Thus, the counter 26 counts the frequency of the voltage-controlled oscillator 21 which changes little by little continuously according to the equation (19), that is, the frequency $k_n$. A voltage-frequency converting circuit of the type, for instance, of a digital voltmeter of the voltage-frequency converting type may be adopted as such a voltage-controlled oscillator 21.

Where the altitude is less than 11,000m, the switch 23 is turned OFF by applying a pulse generated when $V_2=V$ to a terminal 25 from the comparator 5 of FIG. 2 at the time $t=t_1$; thus, the counting of the counter 26 is stopped. In case the altitude is higher than 11,000m, the number 11,000, being memorized in a memory 32, is compared with the contents of the counter 26 by a comparator 33. When the contents of the counter 26 become 11,000, a switch 34 is turned OFF in response to an output from the comparator 33, and the operation command to the arithmetic circuit 27 is no longer applied. At this instant, the content of the accumulator 30 is 0.2487 and the oscillation frequency of the voltage-controlled oscillator 21 is 6334 Hz corresponding to the constant temperature −56.5°C at the altitude of 11,000m or more. After the time $t=t_1$, if the counter 26 is illustratively of the binary type, the contents of the counter 26 indicate the altitude on an indicator 36 through a binary-decimal converter 35 by command from the control circuit 7 (FIG. 2). Further, a reset signal is applied to the terminal 37, and the counter 26 and the accumulator 30 are reset.

Figure 7:
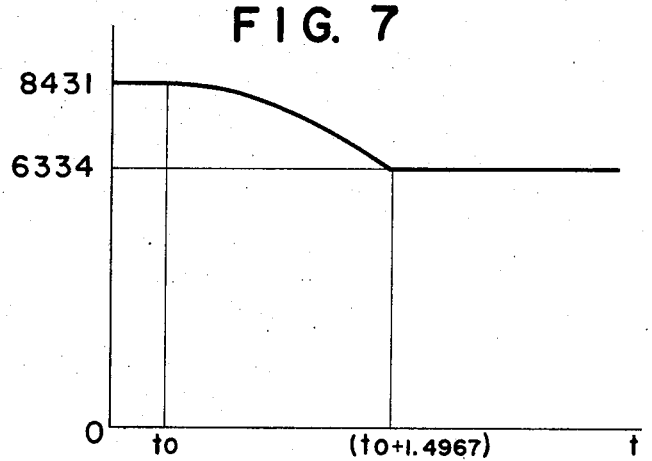
FIG. 7 is a characteristic curve explaining the operation of the circuit of FIG. 6.

FIG. 7 shows a change of the oscillation frequency of the voltage-controlled oscillator 21 of FIG. 6. In FIG. 7, the frequency, which is 8431 Hz at the time $t<t_0$ or $t=t_0$, becomes 6334 Hz corresponding to 11,000m, 1.4967 seconds later in the case of $c=1$, and after that the frequency is constant at this value.

Next, the temperature correction by means of virtually changing the counting frequency of the counter is explained. In the equation (19), let $\Delta t_i$ be constant and denoted by $\Delta t$ and, $$\Delta t_i = \Delta t = 1/8431 \text{ (sec.)} \quad (20)$$

then, as the coefficient $k_n$ is, $$k_n = 8431 - 2.2611 \times 10^{-5} \Sigma k_i \quad (21)$$

the thickness of the $n$th thin layer of the atmosphere measured in the time interval $\Delta t$ becomes the following, as derived from equation (16), $$\Delta H_n = 1 - 2.2611 \times 10^{-5} \times (1/8431) \Sigma k_i \quad (22)$$

The $\Delta H_n$ measured in the time interval $\Delta t$ of 1/8431 seconds at sea-level, is 1m, but as the altitude increases, $\Delta H_n$ becomes less, as indicated in FIG. 5. As $(1/8431)\Sigma k_i$ is the altitude from the level at that point, the temperature corrected equivalent counting frequency can be executed, for instance, by counting the cycles of an 8431 Hz signal with the counter and subtracting the value of the counter at that time, multiplied by $2.2611 \times 10^{-5}$ Hz for every one pulse, from the indication of the counter.

Figure 8:
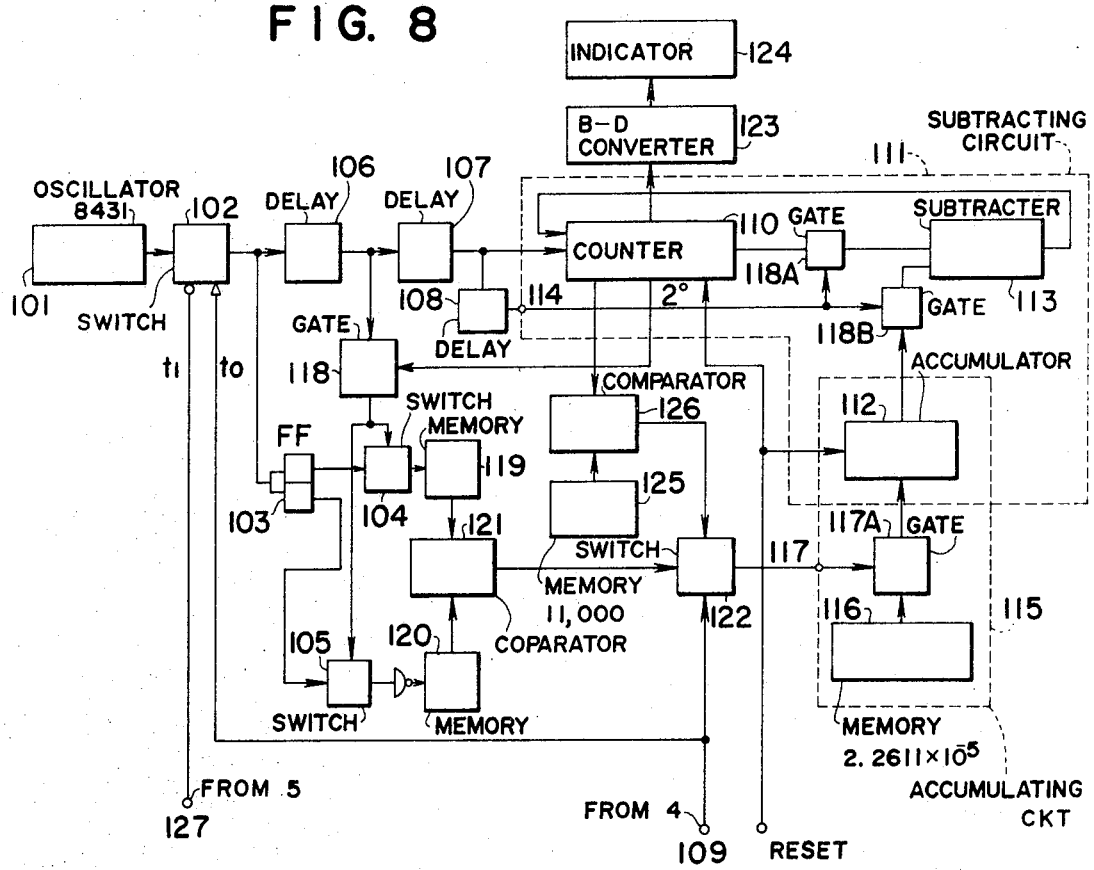
FIG. 8 and FIG. 9 are block diagrams of the two other embodiments of the temperature correction circuits of the barometric altimeter of this invention.

FIG. 8 is a circuit block diagram of an illustrative embodiment which executes the temperature correction of this invention. In FIG. 8, numeral 101 identifies a pulse oscillator which oscillates the said frequency of 8431 Hz, and numeral 102 represents a switch which turns ON in response to a pulse from the terminal 109 and is turned OFF in response to a pulse from a terminal 127. Numeral 103 refers to a T-type flip-flop and is triggered alternately by a pulse applied through the switch 102, and its outputs are applied to switches 104 and 105, alternately turning them ON and OFF. Numerals 106, 107 and 108 designate delay circuits. When a pulse from the comparator 4 of FIG. 2 at the time $t=t_0$, is applied to the terminal 109, the switch 102 turns ON, and the output of the oscillator 101 is counted by a counter 110 through delay circuits 106 and 107. The counter 110, an accumulator 102, and a subtractor 113 compose a subtracting circuit 111 for subtracting the contents of the accumulator 112 from the contents of the counter 110 by an operation command to a terminal 114 through a delay circuit 108; the results of this operation are fed back into the counter 110. The accumulator 112 and a fixed memory 116 compose an accumulating circuit 115. In operation, a signal $2.2611 \times 10^{+5}$, stored in the fixed memory 116, is applied to and summed by the accumulator 112 for each pulse of an operation command applied by the switch 122 through the terminal 117 to gate 117A. The numerals 118, 118A and 118B denote gates. The gate 118 reads the lowest position bit of integer portion, i.e. a $2°$ position bit of the binary counter 110, and stores this position bit in a binary 1 bit memory 119 or 120 through either switch 104 or switch 105, dependent upon which is in its ON state, in response to a pulse applied through the delay circuit 106. An inverted digit is given to the memory 120 in this case.

Now, if the switch 104 is rendered conductive by a pulse from the oscillator 101 and the lowest position bit of integer portion, i.e. the $2°$ position digit of the counter 110, is stored in the memory 119, and if the next pulse from the oscillator 101 is applied, the $2°$ position digit of the counter 110 is inverted and stored in the memory 120. When and only when there is a change in the lowest position digit of the integer portion, i.e. the $2°$ position of the counter 110 at the times of these two pulses, the contents of the memory 119 and 120 become equal and a pulse is generated by a comparator 121. This pulse serves as an operation command to the terminal 117 through the switch 122 when it is in its ON state. Then, the content of the fixed memory 116 is added once to the accumulator 112. As an increment of the contents of the counter 110 is always less than 1 in response to one pulse from the oscillator 101, the accumulation in the accumulator 112 is surely executed for every increment of 1 in the integer portion of the counter 110.

The above process is executed for every 1 pulse of the oscillator 101, i.e. for each 1/8431 seconds, and although the frequency of the oscillator 101 does not change, the equivalent counting frequency of the counter 110 changes with time, as indicated by the equation (22). As a coincident pulse from the comparator 5 in FIG. 2 is applied to the terminal 127 at the time $t_1$ and the switch 102 is turned OFF, the counter 110 serves to indicate the altitude at that time. Further, the contents of the counter 110 are converted by a binary-decimal converter 123 by a command from the control circuit 7 of FIG. 2, and the altitude is indicated by an indicator 124. Finally, the counter 110 and the accumulator 112 are reset by a signal applied to the reset terminal.

If the altitude is higher than 11,000m, the integer portion of the counter 110 is compared with 11,000, i.e. the contents of a memory 125, in a comparator 126. The switch 122 is turned OFF by a signal derived from the comparator 126, and the accumulator 112 continues to hold the constant correcting value for the altitude of 11,000m or more. As a result, the counter 110 counts the equivalent frequency of 6334 Hz until the time $t_1$.

Next, an approximate correction for the temperature is explained below. Using the value of $\theta$ of the equation (13), the term of the temperature correction in the equation (12) is given by, $$1 + 0.00367\theta = 1.05505 - 0.0000119 H_1$$
$$\approx 1.055 - 0.0000119 H_b \quad (23)$$

From the equation (12), $$H_1 \approx 1.055 H_b - 0.0000119 H_b^2 \quad (24)$$

is obtained, but this equation has a small error because $H_b$ is used instead of $H_1$ in the equation (23). To make this error less, for instance, at the vicinity of $H_1 = 10,000$m, the next equation is preferable.

$$H_1 = 1.060 H_b - 0.0000119 H_b^2 \quad (25)$$

An approximation by the equation (25) is described as follows, but similar processes are held in the cases of employing other approximate coefficients.

If $c = 1$ in equation (6) and $\theta = 0$ in equation (9), then, $$H_b = 7991(t_1 - t_0) = k_0(t_1 - t_0) \qquad (26)$$

From equation (25), $$H_1 = 1.060(t_1-t_0)k_0 - 0.0000119(t_1-t_0)^2 k_0^2$$
$$= 1.06k_0(t_1-t_0) - 0.0000106(1.06k_0)^2(t_1-t_0)^2 \ldots \qquad (27)$$

is obtained.

Figure 9:
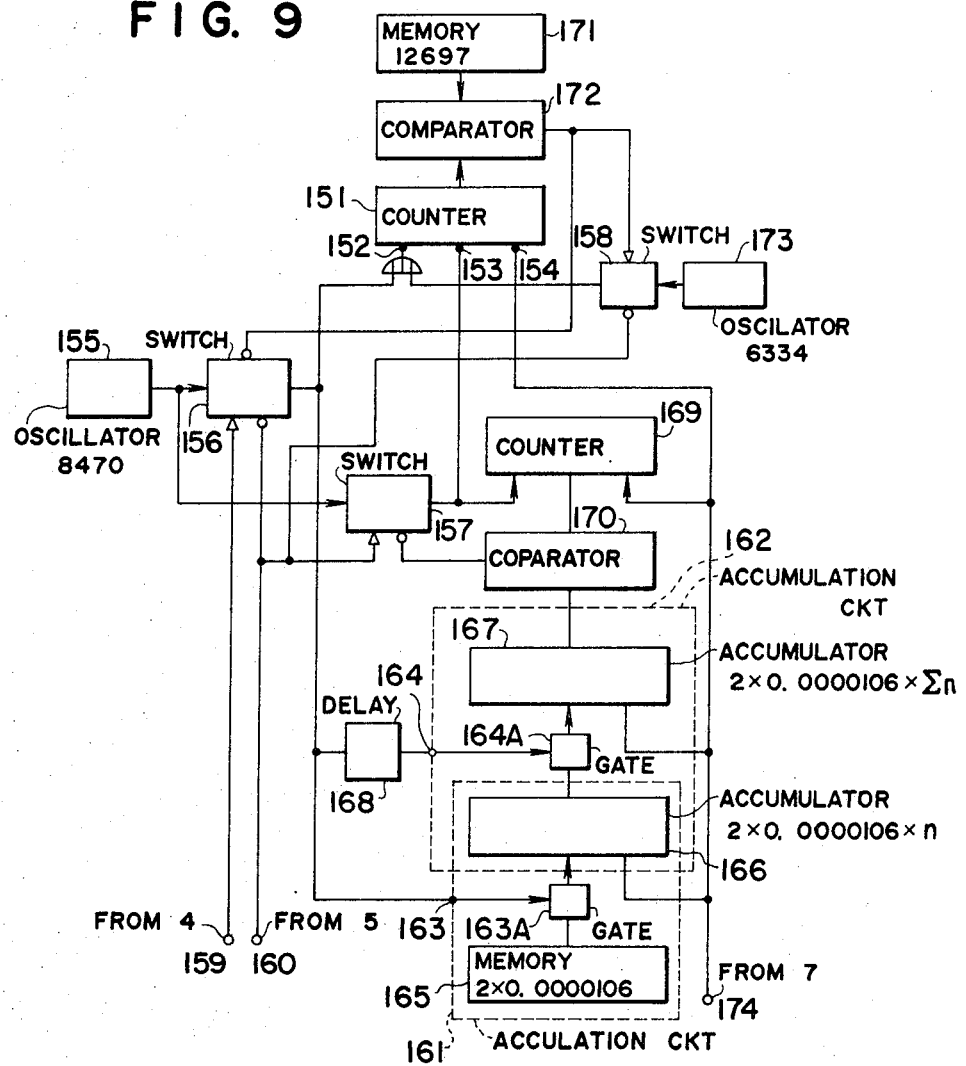

FIG. 9 shows an illustrative embodiment of a circuit which executes the temperature correction according to equation (27). In FIG. 9, numeral 151 designates a reversible counter which counts "up" in response to a pulse applied to a terminal 152 and counts "down" in response to a pulse applied to a terminal 153. A terminal 154 is a reset terminal and is connected with a terminal 174. Numeral 155 identifies an oscillator which generates pulses of the frequency of the first term of the equation (27) as follows, $$1.06k_0 = 8470H_z \qquad (28)$$

Numerals 156, 157 and 158 identify switches and are turned ON in response to pulses to the terminals marked with triangles and are turned OFF in response to pulses applied to the terminals marked with circles. The coincident pulse at the time $t_0$ derived from the comparator 4 in FIG. 2 is applied through a terminal 159 to switch 156 to thereby turn the switch 156 ON. The coincident pulse at the time $t_1$ from the comparator 5 of FIG. 2, is applied through a terminal 160 to switch 156 to turn the switch 156 OFF. Accumulation circuits 161 and 162 are composed respectively of a fixed memory 165 and an accumulator 166, and the accumulator 166 and an accumulator 167. In the accumulation circuit 161, a gate 163A is controlled by an operation command applied to a terminal 163 and a numerical value $2 \times 0.0000106$ stored in the fixed memory 165, is accumulated in the accumulator 166. In the accumulation circuit 162, a gate 164A is controlled by an operation command applied to a terminal 164 through a delay circuit 168, and the contents of the accumulator 166 are non-destructively read out and accumulated in the accumulator 167.

When the switch 156 has been turned ON at the time $t_0$ and $n$ pulses have passed; the content $n$ is stored in the counter 151; the content $2 \times 0.0000106 \times n$ is stored in the accumulator 166, and the content, $2 \times 0.0000106 \times \Sigma n = 0.0000106(n + n^2)$ is stored in the accumulator 167. When the switch 156 has been turned OFF at the time $t_1$; the content $1.06k_0(t_1-t_0)$ is stored in the counter 151, and the content, $$0.0000106[1.06k_0(t_1-t_0)+(1.06k_0)^2(t_1-t_0)^2]$$
$$\approx 0.0000106(1.06k_0)^2(t_1-t_0)^2 \qquad (29)$$

is stored in the accumulator 167.

At this time, the switch 157 is turned ON and a counter 169 begins to count pulses of the oscillator 155. When the contents of the counter 169 have become equal with the contents of the accumulator 167, as determined by a comparator 170, the comparator 170 generates an output to turn the switch 157 OFF. The pulses which have passed through the switch 157 in this interval are also applied to the terminal 153 of the counter 151. Therefore, when the switch 157 has been turned OFF by a pulse output from the comparator 170, the content in the counter 151 is, $$1.06k_0(t_1-t_0) - 0.0000106(1.06k_0)^2(t_1-t_0)^2 \qquad (30)$$

Thus, the altitude $H_1$ for which the temperature correction has been executed according to the equation (27), is present in the above counter 151. The counter output is applied to an indicator and the altitude $H_1$ is indicated.

Next, the temperature correction is explained in cases where altitude $H_1$ is higher than 11,000m. At the ICAO standard atmosphere, the value of $1.06H_b$, corresponding to $H_1 = 11,000$m, is 12,697m. Therefore, 12,697 is stored in a fixed memory 171 and, when this stored value coincides with the contents of the counter 151, the switches 156 and 158 are respectively turned OFF and ON by an output of a comparator 172, and pulses from an oscillator 173 are applied to and counted by the counter 151. By setting the frequency of the oscillator 173 to 6,334 Hz corresponding to the temperature of the altitude 11,000m to 20,000m in the standard atmosphere, the counter 151 continues the counting corresponding to the altitudes which are higher than 11,000m. This counting is stopped by a pulse applied to a terminal 160 at the time $t_1$. Thereafter, the correction for the temperature distribution of the atmosphere at the altitude lower than 11,000m is executed in the same manner as the above-mentioned case. During the process of this correction the contents of the counter decreases and might become again to 12,697 which operates the comparator 172 to turn on the switch 158. To prevent this, the switch 158 is made of the type such that once it turns OFF, then it is kept OFF until the time when processes of this correction are finished. A reset pulse is applied to the terminal 174 from the control circuit 7 of FIG. 2 at the time when processes of the correction have finished to reset the counters 151, 169, and the accumulators 166 and 167.

The above correction is an approximate one, but the accuracy for the ICAO standard atmosphere is good, and the errors are respectively in the order of −2m, 16m, 27m, 35m, 9m, and −1m at the altitudes of 1,000m, 3,000m, 5,000m, 8,000m, 10,000m and 11,000m. There is no additional error at the altitude higher than 11,000m.

The counters 26 of FIG. 6, 110 of FIG. 8, and 151 and 169 of FIG. 9 are the conventional counters whose contents increase by 1 for 1 input pulse. Alternatively, they may be composed of registers with adders constructed to increase their contents by the specific number $a$ for 1 input pulse. In this case, the frequency of the oscillator which provides command pulses, the contents of the memory which is used for the temperature correction, and the operation control circuit have to be modified correspondingly.

FIG. 10 shows an illustrative embodiment of the modifications of the counter 110, the temperature correcting circuit, and its control circuit of FIG. 8. In FIG. 10, numeral 201 refers to a terminal corresponding to the input terminal of counter 110, numeral 202 designates a register corresponding to the counter 110, numeral 204 represents an accumulator corresponding to the accumulator 112 of FIG. 8, numeral 205 identifies a memory corresponding to the memory 116 of FIG. 8, and numeral 203 refers to a memory. Numeral 206, indicated by dotted lines, designates an adding circuit which adds the content $a$ of the memory 203 to the register 202 in response to a command pulse applied to the terminal 209, where $a$ is a positive value. Numeral 207, indicated by chain-lines, refers to an adding circuit which adds algebraically the contents of the accumulator 204 to the register 202 in response to a command pulse applied to the terminal 210. Numeral 208, indicated by dotted lines, identifies an adding circuit which adds algebraically the content $b$ of the memory 205 to the accumulator 204 in response to a command pulse applied to the terminal 211. Numeral 212 designates an operation control circuit which applies to the terminal 211 command pulse(s) equal in number to the increment of the integer portion of the content of the register 202 for every pulse applied to the terminal 201.

Provided that the content of the register 202 is $X$, $N$ pulses are applied to the terminal 201, and $X=0$ at $N=0$; the content of the accumulator 204 becomes $bX$. Therefore, when $\Delta N$ more pulses are applied, the increment of $X$ is given as follows, $$\Delta X = a\Delta N + bX\Delta N \quad (31)$$

Therefore, by integrating equation (31), $$X = a/b\,(e^{bN} - 1) \quad (32)$$

is obtained. While, from the equations (17) and (19), $$k_n = 8431[1 - 2.2611 \times 10^{-5} H_n] \quad (33)$$

is obtained. From the equations (16) and (33), $$\Delta H_n = 8431[1 - 2.2611 \times 10^{-5} H_n]\Delta t_n \quad (34)$$

is introduced. Integrating this equation (34), $$H = \frac{[e^{2.2611 \times 10^{-5} \times 8431 t} - 1]}{-2.2611 \times 10^{-5}} \quad (35)$$

is obtained.

Comparing equations (32) and (35), $X$ of the equation (32), i.e. the value which is obtained by the content of the register 202, indicates the altitude $H$ by replacing as follows, $$bN = 0 - 2.2611 \times 10^{-5} \times 8431 t \quad (36)$$

$$b/a = -2.2611 \times 10^{-5} \quad (37)$$

Therefore, the altitude $H$ may be obtained by choosing properly the content $a$ of the memory 203, the content $b$ of the memory 205, and the pulse frequency $N/t$ applied to the terminal 201, to satisfy the equations (36) and (37) using the circuits indicated in FIG. 10, instead of the counter, its correcting circuit, and control in FIG. 8.

As mentioned above, the circuits shown in FIG. 10 may be regarded as an equivalent counter which counts $a$ for 1 input pulse in comparison with the counter 110 in FIG. 8 which counts 1 for each input pulse. In this case, $a$ may not be an integer. As a pulse is applied to the terminal 117 through the switch 122 in FIG. 8, is generated for every change of the 2° position digit of the counter 110, it results to generate command pulses to the terminal 117 equal in number to the increment of the integer portion of the content of the counter for each input pulse. This process is equivalent in effect to that of the control circuit 212 of FIG. 10. Changing the correction mode at the altitude 11,000m is also performed similarly by generating a control pulse when the content of the register 202 has reached a value corresponding the altitude 11,000m to stop the accumulating operation of the content of the memory 205 to the accumulator 204.

FIG. 10 can be modified to get the same result as follows. Instead of storing number $a$ in the memory 203, it is stored in the accumulator 204, and the content of the memory 205 which represents the absolute value of $b$ is subtracted from the content of accumulator 204 number of time corresponding to the increment of the content of register 202, for each pulse applied at the terminal 201, and the content of the accumulator 204 is added to the register 202 corresponding to each pulse applied at the terminal 201. In this modification the memory 203 can be eliminated.

As stated before, the characteristics of the counter 110, its correcting circuit, and control circuit of FIG. 8, and the circuits shown in FIG. 10 are, briefly, as follows;

1. the counter or the register changes its content by a specific numerical value for every input pulse;

2. the control circuit detects a change of the content of the counter or the register for each input pulse and generates command pulse(s) corresponding in number to the increment of integer portion of the content;

3. the accumulator accumulates the content of the memory in response to command pulse(s); and 4. the content of this accumulator is further accumulated in cascade in the counter or the register for every input pulse.

The counter 151 of FIG. 9 operates in a manner similar to that described above, and can also be constructed to perform the similar action even when a counter is not one which counts 1 for each 1 pulse.

In the embodiment shown in FIG. 9, the circuit operates to accumulate and store the correcting value proportional to the square of the altitude in the accumulator 167 until the altitude to be measured or 11,000m is attained and then, to subtract this correcting value from its contents after disabling the counting of the counter 151. The same result is also obtained by using a register instead of the counter 151, by making 1 added for each pulse, and by subtracting the contents accumulated in the accumulator 166 from the register. In this case, the accumulator 167, the counter 169, and the comparator 170 can be omitted. Further, the same result is also attained by changing the state of the switches 156 and 158 in response to the signal from the comparator 172 when the content of the register 151 totals 11,000 and after storing 11,000 in the memory 171. The following process is also used to perform the same result. Namely, the register 151 continues the addition of 1 for each pulse of the oscillation frequency 8470Hz of the oscillator 155 and the accumulation in the accumulator 166 from the memory 165 is stopped at the time when the content of the register 151 reaches the value 11,000, and the constant value accumulated in the accumulator 166 is subtracted from the register 151 for every 1 pulse from the oscillator 155.

Above descriptions are made for $c=1$ in equation (2), but this invention is not limited to this specific value of $c$. For other values of $c$, it is obvious only to change the numerical values used in the description according to the value of $c$.

As mentioned above, the barometric altimeter of this invention can measure and indicate the altitude by its digital processes and execute the temperature correction automatically in short time. Therefore, it will prove the excellent performance for aircraft.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting sense.

What is claimed is:

1. Apparatus to obtain an accurate indication of altitude, said apparatus comprising:
   a. first means for generating a first electrical signal proportional to the atmospheric pressure at a reference altitude;
   b. second means responsive to the atmospheric pressure for generating a second electrical signal proportional to the atmospheric pressure at the altitude to be measured;
   c. time signal means for generating a signal esponentially varying with time;
   d. coincidence means for generating first and second coincidence signals respectively at times $t_o$ and $t_1$ when the exponentially varying signal coincides with the first and second signals, respectively;
   e. count means responsive to the first and second coincidence signals for counting at a selected counting frequency during the interval between the first and second coincidence signals; and
   f. correction means for correcting the contents of said count means with regard to the temperature of the atmosphere.

2. Apparatus as claimed in claim 1, wherein said correcting means varies the selected counting frequency of said count means according to the temperature distribution.

3. Apparatus as claimed in claim 1, wherein said correction means varies continuously with time the selected counting frequency of said count means according to the temperature distribution.

4. Apparatus as claimed in claim 1, wherein said count means includes oscillator means for generating and applying the selected counting frequency to said count means, and further including accumulator means for receiving and storing an incremental input for every count-pulse of said count means, for controlling said selected counting frequency in accordance with the content of said accumulator means.

5. Apparatus as claimed in claim 4, wherein said oscillator means is responsive to a predetermined count of said count means corresponding to a predetermined altitude, for generating subsequently the constant frequency.

6. Apparatus as claimed in claim 1, wherein said correction means comprises arithmetic means coupled to said count means for subtracting the number determined by the counted contents of said count means, from the accumulated contents of said count means, to correct for temperature distribution.

7. Apparatus as claimed in claim 6, wherein there is further included second arithmetic circuit comprising accumulator means for storing a predetermined number therein, said accumulator means responsive to the incremental value of said count means for accumulating the number stored in said memory means, to determine thereby the number determined by the counted contents of said count means.

8. Apparatus as claimed in claim 7, wherein there is further included detection means associated with said count means for detecting a change of the 2° digit of said count means, and said second arithmetic means comprising a memory for storing a predetermined number therein, said second arithmetic means responsive to each change of the 2° digit for applying the number in said memory means to said accumulator means for accumulation therein.

9. Apparatus as claimed in claim 6, wherein said arithmetic means is operative in a first mode for determining altitudes less than a specific altitude and in a second mode for determining altitudes greater than the specific altitude, said arithmetic circuit responsive to said count means when it has counted a number corresponding to the specific altitude to be disposed from its first to its second mode of operation.

10. Apparatus as claimed in claim 1, wherein said count means is responsive at time $t_o$ to the occurrence of the first coincident signal to initiate its counting operation, and responsive at time $t_1$ to the second coincident signal to terminate its counting operation.

11. Apparatus as claimed in claim 10, wherein said correction means is responsive to the counted contents of said count means for compensating for temperature in a manner proportional to the square of the counted contents of said count means after said count means has terminated its counting operation in response to said second coincidence signal.

12. Apparatus as claimed in claim 11, wherein said correction means comprises first and second accumulator means and memory means for storing a predetermined number therein, said correction means responsive to each pulse counted by said count means for accumulating the stored number in said first accumulator means and for accumulating in cascade the contents of said first accumulator means in said second accumulator means, to obtain a compensation value proportional to the square of the counted contents of said count means.

13. Apparatus as claimed in claim 1, wherein said correction means includes first oscillator means for generating a first clock signal of a first frequency and second oscillator means for generating a second clock signal of a second, different frequency from that of the first frequency, said correction means operative in a first mode for applying the first clock signal to said count means until said count means counts a selected number of clock pulses corresponding to a specific altitude, and in a second mode after said count means has counted the selected number of clock pulses for applying the second clock signal to said count means, said correction means subtracting a value proportional to the square of the number of pulses counted by said count means in response to the first clock signal after said count means has stopped counting.

14. Apparatus as claimed in claim 1, wherein said correction means comprises subtraction means, said count means being responsive to a series of clock pulses for counting the clock pulses, and said subtraction means subtracts the number proportional to the counted contents of said count means from each count of said count means.

15. Apparatus as claimed in claim 1, wherein there is further included display means responsive to said count means for providing an indication of the contents of said count means after said count means has stopped counting and said correction finished.

16. A barometric altimeter comprising:
 a. first means for generating a first signal proportional to the atmospheric pressure at a reference altitude;
 b. second means for generating a second signal proportional to the atmospheric pressure at the altitude to be measured;
 c. third means for generating a signal varying exponentially with time;
 d. coincidence means for generating first and second coincidence signals at times $t_0$ and $t_1$ when the signal of said third means coincides with the first and second signals, respectively;
 e. clock pulse generating means for generating clock pulses and responsive to the first coincidence signal to initiate its operation and responsive to the second coincidence signal to terminate its operation;
 f. memory means for storing a predetermined number therein;
 g. accumulator means to accumulate the predetermined number of the said memory means therein;
 h. register means responsive to each clock pulse for varying the content of said register means in accordance with the content of said accumulator means during the interval between the times $t_0$ and $t_1$;
 i. command pulse generating means for accumulating predetermined number of said memory means in said accumulator means a number of times in accordance with the increment of the content of said register means for each clock pulse.

17. A barometric altimeter as claimed in claim 16, wherein there is further included means to discontinue the accumulation of the content of said memory means to said accumulator means when the content of the said register means has reached a predetermined value.

18. A barometric altimeter as claimed in claim 16, wherein there is further included display means for providing an indication of the contents of said register after the termination of the generating of the clock pulses.

* * * * *